Patented Nov. 19, 1935

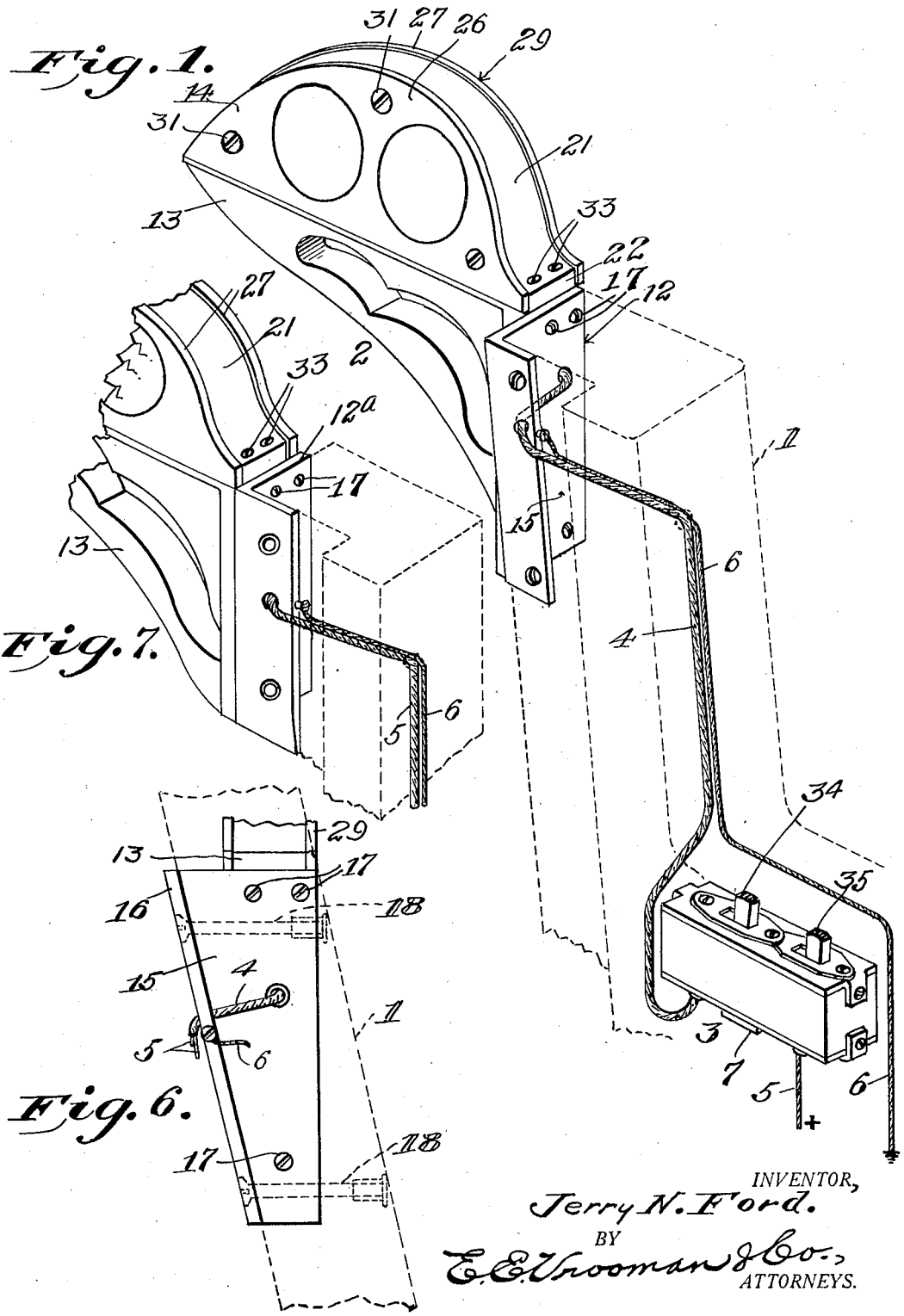

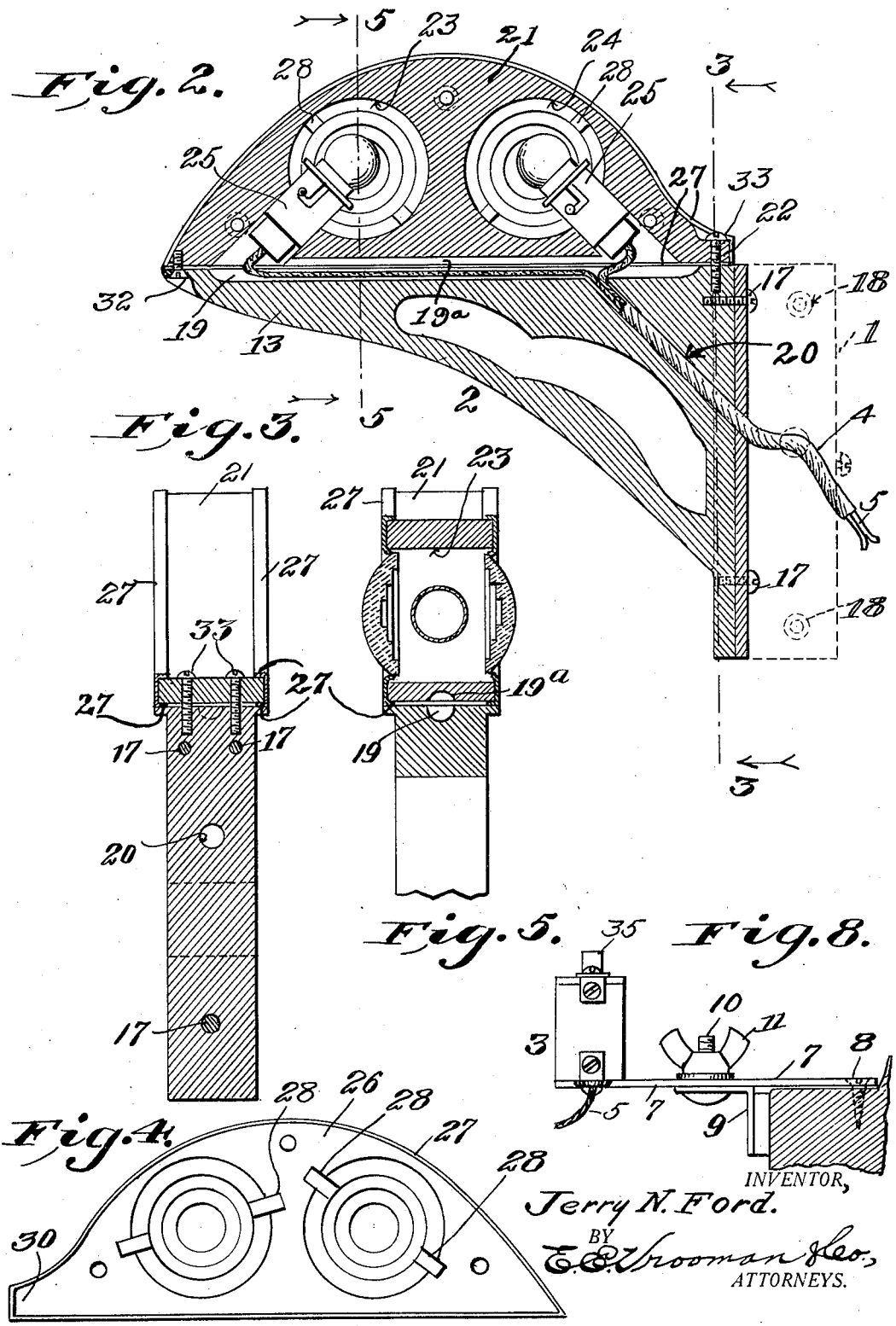

2,021,447

UNITED STATES PATENT OFFICE 2,021,447

STREAM LINE TRAFFIC SIGNAL FOR VEHICLES

Jerry N. Ford, Monterey Park, Calif.

Application September 18, 1934, Serial No. 744,601

3 Claims. (Cl. 177—329)

This invention relates to a streamline traffic signal for vehicles.

An object of the invention is the construction of a simple and efficient signal adapted to project outwardly from a motor vehicle, whereby the operator of the vehicle on which the signal is mounted can indicate to the traffic the positive direction he is to take in turning.

Another object of the invention is the construction of a signal comprising a peculiarly formed bracket carrying a casing support and a casing, all constituting a necessary unit for performing the single function of signaling in traffic.

A still further object of the invention is the construction of a signal unit, no one part of which is independent from the other, and which signal unit is peculiarly adapted to be attached to an inclined portion of the frame of the latest type automobile.

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Figure 1 is a perspective view of a signal constructed in accordance with the present invention.

Figure 2 is a vertical, central, longitudinal sectional view of my signal.

Figure 3 is a sectional view taken on line 3—3, Fig. 2 and looking in the direction of the arrows.

Figure 4 is a view in elevation, looking at the inside of the rear cover plate.

Figure 5 is a sectional view taken on line 5—5, Figure 2 and looking in the direction of the arrows.

Figure 6 is a rear elevated view of a portion of my signal.

Figure 7 is a fragmentary perspective view of the signal showing another embodiment of the brackets.

Figure 8 is a view in elevation of the supporting device for the switch.

Referring to the drawings by numerals, the dotted lines 1 represent any suitable support for my signal, but preferably, the inclined frame of the modern type windshield. The signal device 2 is connected to switch 3 by cable 4. A wire 5 (Fig. 1) is connected to a source of electric current and the device is suitably grounded through wire 6. The switch 3 is mounted on a bar 7 that is secured by screw 8 to the windshield frame or steering wheel as the operator desires. A sliding clamp member 9 is held in an adjustable position by screw 10 and nut 11, Fig. 8.

The signal device comprises a bracket 12, casing support 13 and casing 14. These units are absolutely necessary in a complete and operative signal, of the class hereinafter specifically described.

The bracket 12 is provided with a V-shape body 15, Fig. 6. This body 15 has a right angle flange 16 on its inner edge, and the casing support 13 is secured by means of screws 17 at the outer edge of the V-shape body 15. By reason of this peculiarly constructed bracket 12, the signal device may be mounted on the modern inclined frame of a windshield, with the signal device in a perfect vertical position, for efficient signaling purposes. As shown in dotted lines bolts 18 may be countersunk, or otherwise suitably mounted on bracket 12 and the windshield frame.

The casing support 13 is provided in its upper face with a longitudinally extending groove 19 communicating with an inclined cable aperture 20, through which cable 4 extends. The casing support is preferably rectangular in shape for the efficient assembling as herein described.

The casing 14 comprises body 21 that is provided at its inner end with a horizontal extension 22. The casing body 21 is preferably provided with bulb compartment 23 and bulb compartment 24. In the bottom of body 21 is a longitudinally extending groove 19a which registers with groove 19 of the casing support. These two grooves form a channel or compartment for the wires of cable 4, leading to the bulb sockets 25, positioned in body 21 and extending into the compartments 23 and 24, with bulbs mounted upon said sockets to illuminate the compartments. Preferably compartment 23 has in its rear a red glass and in its front a white glass, while compartment 24 has in its rear a green glass and in its front an amber glass. Referring to Fig. 4, the rear cover plate 26 is made of suitable metallic material and is provided all around its edge with an inwardly extending flange 27. Suitable clips 28 are fastened to the inner face of the cover plate for assisting in holding the glasses in position. The front cover plate 29 is of similar construction, each plate having at its inner end an extension 30 for fitting over the extension 22 of the body 21. The flanges 27 of the cover plate overlap the body 21 as clearly seen in Figs. 3 and 5. Screws 31 are employed for fastening the cover plates upon the body 21.

Two vertical screws 32 are countersunk in the outer end of casing support 13 (Fig. 2) and extend up into body 21. Vertical screws 33 extend down through extension 22 and into the casing support 13, whereby the casing support and casing are efficiently secured together. When the two units of the signal (casing support 13 and body 21) are thus secured together, the lower flanges of the two cover plates 26 will be clamped between support 13 and body 21, as shown in Figs. 3 and 5, whereby the cover plates are more securely held in position.

In Fig. 7, I have shown an ordinary type of a bracket 12a which can be used in mounting the signal device on an ordinary vertical post or vertical windshield frame.

The operating stem 34 of switch 3 controls the illumination of the bulb in compartment 23, so that when the operator desires to turn to the left all he has to do is to manipulate stem 34 and the traffic will be advised of the intentions of the operator. When the operator begins to turn to the right he manipulates stem 35 of the switch 3 which causes the light in compartment 24 to be illuminated, indicating to the traffic the intentions of the operator.

The bracket 12 is so peculiarly adapted to this signal that it is an essential unit of the device, and likewise is the casing support with its groove 19, constituting a necessary part of the channel for the wires, which wires also enter the casing body 21, as hereinbefore described; that is, the wires of the cable 4 are connected to the sockets 25.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a signaling device, the combination of a casing support, said casing support provided with a cable receiving aperture, said casing support provided in its upper edge or face with a longitudinally extending groove registering with said receiving aperture, a casing on said casing support, said casing provided with a longitudinally extending groove registering with the groove of said casing support, and said grooves forming a longitudinally extending channel.

2. In a signaling device, the combination of a casing support, a casing on said casing support, said casing provided at its inner end with an outwardly-extending extension, vertical screws countersunk in the outer end of said casing support and extending into said casing, and vertical screws extending through said outwardly-extending extension and down into said casing support.

3. In a signaling device, the combination of a casing comprising a body provided at its inner end with an outwardly-extending extension, cover plates provided with outwardly-extending extensions and with continuous inwardly-extending flanges all around their edges, said cover plate and flanges fitting over said casing-body and its extension, a casing support under said casing with the bottom flanges of said cover plates between the casing body and said casing support, screws extending down through the outwardly-extending extension into said casing support, and screws within the marginal edges of and connecting the outer ends of said casing body and said casing support.

JERRY N. FORD.